United States Patent Office 2,792,404
Patented May 14, 1957

2,792,404

1-(β-HYDROXYETHYL)-2-SUBSTITUTED AMINO-2-IMIDAZOLINE

David L. Garmaise, Montreal, Quebec, and Arthur F. McKay, Pointe Claire, Quebec, Canada, assignors to Monsanto Canada Limited, La Salle, Quebec, Canada, a body politic and corporate No Drawing. Application February 20, 1956,
Serial No. 566,357

4 Claims. (Cl. 260—309.6)

The present invention relates to imidazoline derivatives more particularly to 1-(β-hydroxyethyl)-2-substituted amino-2-imidazoline.

The products of the present invention correspond to the general formula—

$$\begin{array}{c} CH_2CH_2OH \\ | \\ CH_2-N \\ | \quad \quad \diagdown \\ \quad \quad \quad C-NHR \\ | \quad \quad \diagup \\ CH_2-N \end{array}$$

wherein R stands for an alkyl radical having from 12 to 18 carbon atoms. The products of the present invention have been found to be particularly effective in lowering surface tension.

The products of the present invention are prepared by heating a salt of 1-(β-hydroxyethyl)-2-methylmercapto-2-imidazoline (A. F. McKay and G. R. Vavasour, Can. J. Chem. 32: 59 (1954) or its free base in an inert solvent with a primary amine $RNH_2$ wherein R stands for an alkyl radical having from 12 to 18 carbon atoms. The methylmercaptan released during the reaction is vented in a scrubber. On evaporation of the reaction mixture, the 1-(β-hydroxyethyl)-2-substituted amino-2-imidazoline is obtained as its salt or as a free base.

If this product is obtained in the form of its salt it can be converted to its free base by methods well known in the art, for example, by passage of its solution through ion exchange resins. On the other hand, if it is obtained in the form of its free base, it can be converted to its acid salt by methods well known in the art.

In United States Patent 2,586,844, compounds resembling the compounds of the present invention are disclosed. The difference in structure is that the compounds of the present invention have a β-hydroxyethyl radical in position-1 instead of a hydrogen. The difference is very significant since it causes the compounds of the present invention to be particularly useful as in lowering surface tension. The presence of the β-hydroxyethyl improves the polar properties of the compound thus rendering the compounds of the present invention useful as surface-active agents, detergents or flotation agents. Furthermore, the presence of the β-hydroxyethyl radical renders the compounds of the present invention useful as intermediates in the preparation of compounds of the formula referred to above.

The preparation of the products of the present invention can be illustrated as follows—

$$\begin{array}{c} CH_2CH_2OH \\ | \\ CH_2-N \\ | \quad \quad \diagdown \\ \quad \quad \quad C-SCH_3 + RNH_2 \longrightarrow \\ | \quad \quad \diagup \\ CH_2-N \end{array} \quad \begin{array}{c} CH_2CH_2OH \\ | \\ CH_2-N \\ | \quad \quad \diagdown \\ \quad \quad \quad C-NHR + CH_3SH\uparrow \\ | \quad \quad \diagup \\ CH_2-N \end{array}$$

The inert solvent used is one which will dissolve both reactants and which is non-reactive with them.

As an example of suitable alkylamines, there may be mentioned n-propylamine, n-octylamine, n-dodecylamine, n-tetradecylamine, n-hexadecylamine, n-octadecylamine.

The present invention will be more fully understood by referring to the following examples which should not be considered as limiting the invention:

EXAMPLE I

*1-(β-hydroxyethyl)-2-(γ-dimethylaminopropylamino)-2-imidazoline*

$$\begin{array}{c} CH_2CH_2OH \\ | \\ CH_2-N \quad \quad \quad \quad \quad \quad CH_3 \\ | \quad \quad \diagdown \quad \quad \quad \quad \quad \diagup \\ \quad \quad \quad C-NHCH_2CH_2CH_2N \\ | \quad \quad \diagup \quad \quad \quad \quad \quad \diagdown \\ CH_2-N \quad \quad \quad \quad \quad \quad CH_3 \end{array}$$

A solution of 8.4 parts by weight of γ-dimethylaminopropylamine and 23.5 parts of 1-(β-hydroxethyl)-2-methylmercapto-2-imidazolinium iodide in 50 parts of methanol was refluxed for two hours. The evolved methyl mercaptan was absorbed in 20% sodium hydroxide solution. At the end of the reflux period, the methanol was removed by evaporation and the oily residue was dissolved in 500 parts of water. This solution was passed through a column of 500 parts of activated Amberlite IRA-400 resin after which the column was washed with 1500 parts of water. The combined eluate and washing was taken to dryness in vacuo and the residue was distilled, yield 12.4 parts (71.5%). This oil (B. P. 183–184° C./3 mm.) was redistilled for analysis. Analysis of the 1-(β-hydroxyethyl) - 2 - (γ-diethylaminopropylamino)-2-imidazoline gave 55.78% carbon and 10.43% hydrogen, compared with the theoretical calculated for $C_{10}H_{22}N_4O$ of 56.04% carbon and 10.35 hydrogen. Its dipicrate melted at 125–126° C. Analysis of this dipicrate gave 20.4% nitrogen, compared with the theoretical calculated for $C_{22}H_{28}N_{10}O_{15}$ of 20.80%.

EXAMPLE II

*1-(β-hydroxyethyl)-2-(γ-diethylaminopropylamino)-2-imidazoline*

$$\begin{array}{c} CH_2CH_2OH \\ | \\ CH_2-N \quad \quad \quad \quad \quad \quad C_2H_5 \\ | \quad \quad \diagdown \quad \quad \quad \quad \quad \diagup \\ \quad \quad \quad C-NHCH_2CH_2CH_2N \\ | \quad \quad \diagup \quad \quad \quad \quad \quad \diagdown \\ CH_2-N \quad \quad \quad \quad \quad \quad C_2H_5 \end{array}$$

Sixty-five parts by weight of γ-diethylaminopropylamine and 144 parts of 1-(β-hydroxyethyl)-2-methylmercapto-2-imidazolinium iodide in 200 parts of methanol were refluxed for two hours. The residue from evaporation of the methanol was dissolved in 1000 parts of water and this solution was passed through a column of 1500 parts of Amberlite IRA-400 resin. The aqueous eluate was taken to dryness and the residue (oily) was distilled under vacuum. An oil (B. P. 164–165° C./0.20 mm.) was obtained in good yield. Analysis of the 1-(δ-hydroxyethyl) - 2 - (γ-diethylaminopropylamino) - 2 - imidazoline gave 59.21% carbon and 11.02% hydrogen, compared with the theoretical calculated for $C_{12}H_{26}N_4O$ of 59.45% carbon and 10.82% hydrogen.

EXAMPLE III

*1-(β-hydroxyethyl)-2-(β-dimethylaminoethylamino)-2-imidazoline*

$$\begin{array}{c} CH_2-CH_2OH \\ | \\ CH_2-N \quad \quad \quad \quad \quad \quad CH_3 \\ | \quad \quad \diagdown \quad \quad \quad \quad \quad \diagup \\ \quad \quad \quad CNH-CH_2CH_2N \\ | \quad \quad \diagup \quad \quad \quad \quad \quad \diagdown \\ CH_2-N \quad \quad \quad \quad \quad \quad CH_3 \end{array}$$

A solution of 44 parts by weight of β-dimethylaminoethylamine and 139 parts of 1-(β-hydroxyethyl)-2-methylmercapto-2-imidazolinium iodide in 300 parts of methanol was refluxed for two hours. This reaction mixture was evaporated in vacuo to remove the solvent and the oily residue was dissolved in 1000 parts of water. After passing the dilute aqueous solution through 1800 parts of Amberlite IRA-400 resin and washing the column with water, the combined eluates were taken to dryness. The 1-(β-hydroxyethyl)-2-(β-dimethylaminoethylamino)-2-imidazoline was obtained by distilling the residue in vacuo.

EXAMPLE IV

*1 - (β - hydroxyethyl) - 2 - (β - diethylaminoethylamino)- 2-imidazoline*

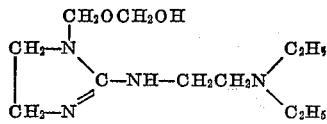

A solution of 1-(β-hydroxyethyl)-2-methylmercapto-2-imidazolinium iodide (57.6 parts) and β-diethylaminoethylamine (25.5 parts) in 150 parts of methanol was refluxed until the evolution of methylmercaptan ceased. The solvent was removed by evaporation and the residue was dissolved in 1000 parts of water. This aqueous solution was passed through a column of 1000 parts of IRA-400 resin at the rate of 25 parts per minute and the column was washed with 2000 parts of water. On evaporation of the water from the combined eluate and washings, a 90.8% yield of crude 1-(β-hydroxyethyl)-2-(β-diethylaminoethylamino)-2-imidazoline was obtained. The dipicrate formed in the usual manner melted at 166.5–167° C. This compound on analysis gave 40.49% carbon, 4.67% hydrogen and 20.33% nitrogen compared with the calculated for $C_{23}H_{30}N_{10}O_{15}$ of 40.23% carbon, 4.40% hydrogen and 20.40% nitrogen.

EXAMPLE V

*1 - (β - hydroxyethyl) - 2 - (n - propylamino) - 2 - imidazoline*

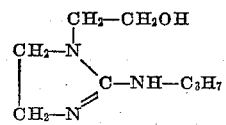

1 - (β - hydroxyethyl) - 2 - methylmercapto - 2 - imidazolinium iodide (86.4 parts) and n-propylamine (19.5 parts) were refluxed in 150 parts by volume of methanol over a period of ninety minutes. The methanol was removed by evaporation and the residue was dissolved in 500 parts by weight of water. This aqueous solution was passed through a column of activated IRA-400 resin (800 parts) at the rate of 10 parts by volume of solution per minute. Then the column was washed with 2,500 parts of water and the eluate and washings adjusted to a pH of 2.0 with hydrochloric acid solution were taken to dryness. The yield of 1-(β-hydroxyethyl)-2-n-propylamino-2-imidazolinium chloride was 90% of theory. Its picrate formed in the usual manner melted at 136.5° C. This product on analysis gave 49.00% carbon, 5.91% hydrogen and 12.48% nitrogen compared with the calculated for $C_{14}H_{20}N_6O_8$ of 49.12% carbon, 5.89% hydrogen and 12.28% nitrogen.

EXAMPLE VI

*1 - (β - hydroxyethyl) - 2 - n - octylamino - 2 - imidazoline*

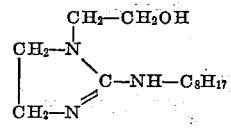

A solution of 86.4 parts of 1-(β-hydroxyethyl)-2-methylmercapto-2-imidazolinium iodide and 45 parts of n-octylamine in 150 parts of methanol was refluxed for two hours. The solution was evaporated and the residue in 800 parts of water was passed through a column of IRA-400 resin (800 parts) to remove the iodide ion. The eluate and washings were acidified with hydrochloric acid and then taken to dryness. This gave a 54.5% yield of 1-(β-hydroxyethyl)-2-n-octylamino-2-imidazolinium chloride.

EXAMPLE VII

*1 - (β - hydroxyethyl) - 2 - n - dodecylamino - 2 - imidazoline*

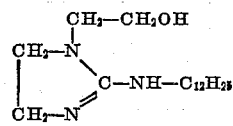

1 - (β - hydroxyethyl) - 2 - methylmercapto - 2 - imidazolinium iodide (86.4 parts) and n-dodecylamine (55 parts) were condensed in the manner described in the previous examples. After removal of the methanol, the residue was dissolved in 4000 parts of water and then passed through a column of IRA-400 resin. The resin column was washed with 6000 parts of water and the combined eluate and washings were acidified with concentrated hydrochloric acid solution. Evaporation of the solution to dryness gave a 86.5% yield of the 1-(β-hydroxyethyl) - 2 - n - dodecylamino - 2 - imidazolinium chloride. The phenylisothiocyanate derivative formed in the usual manner melted at 100–102° C. This derivative on analysis gave 66.61% carbon, 9.38% hydrogen, 13.15% nitrogen and 7.20% sulfur compared with the calculated for $C_{24}H_{40}N_4OS$ of 66.61% carbon, 9.32% hydrogen, 12.95% nitrogen and 7.41% sulfur.

EXAMPLE VIII

*1 - (β - hydroxyethyl) - 2 - n - tetradecylamino - 2 - imidazoline*

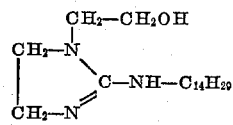

A solution of 1-(β-hydroxyethyl)-2-methylmercapto-2-imidazolinium iodide (86.4 parts) and 63.9 parts of n-tetradecylamine in 200 parts of methanol was refluxed for three hours. This solution was diluted with 300 parts of methanol and then it was passed through a column of IRA-400 (1000 parts of resin previously washed with 800 parts of methanol). The column was washed with methanol until the methanol solutions no longer gave a picrate. The combined eluate and washings then were taken to dryness, yield 97.5 parts (100%) of 1 - (β - hydroxyethyl) - 2 - n - tetradecylamino - 2 - imidazoline. This compound was characterized as a salt with dibenzoyl-D-tartaric acid. This tartrate (M. P. 114–116° C.) on analysis gave 65.01% carbon, 7.85% hydrogen and 6.05% nitrogen compared with the theoretical calculated for $C_{37}H_{53}N_3O_9$ of 65.00% carbon, 7.80% hydrogen and 6.14% nitrogen.

EXAMPLE IX

*1-(β-hydroxyethyl)-2-(n-hexadecylamino)-2-imidazoline*

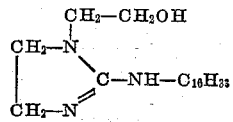

A solution of 1-(β-hydroxyethyl)-2-methylmercapto-2-imidazolinium iodide (57.6 parts) and n-hexadecylamine (48.2 parts) in 200 parts of methanol was refluxed for three hours. This solution was diluted with 250 parts of methanol and then passed through a column of IRA-400 resin (1200 parts) which had been washed previously with methanol. The column was washed with 2000 parts of methanol and the eluate and washings were taken to dryness. The yield of 1-(β-hydroxyethyl)-2-(n-hexadecylamino)-2-imidazoline, was 70.5 parts by weight or 99.9%. The dibenzoyl-D-tartrate salt (M. P.

110–111° C.) of 1-(β-hydroxyethyl)-2-(n-hexadecylamino)-2-imidazoline was formed in the usual manner. This salt on analysis gave 66.17% carbon, 8.29% hydrogen and 6.01% nitrogen compared with the calculated for $C_{39}H_{57}N_3O_{11}$ of 65.80% carbon, 8.07% hydrogen and 5.90% nitrogen.

EXAMPLE X

*1-(β-hydroxyethyl)-2-(n-octadecylamino)-2-imidazoline*

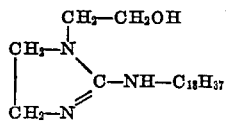

1-(β-hydroxyethyl)-2-methylmercapto-2-imidazolinium iodide (57.6 parts) and n-octadecylamine (53.8 parts) were refluxed for two hours in solution in 150 parts of methanol. This solution was diluted with 300 parts of methanol and then it was passed through a column of IRA-400 resin (700 parts). The column was washed with methanol until the methanol washing failed to give a positive picrate test for amine. The eluate and washings on evaporation gave 72 parts (94.2%) of the 1-(β-hydroxyethyl)-2-(n-octadecylamino)-2-imidazoline.

We claim:
1. As new products 1-(β-hydroxyethyl)-2-substituted-amino-2-imidazoline corresponding to the general formula:

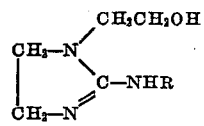

wherein R stands for an alkyl radical having from 12 to 18 carbon atoms, and their acid salts.

2. 1 - (β-hydroxyethyl)-2-(n-dodecylamino)-2-imidazoline.

3. 1-(β-hydroxyethyl)-2-(n-tetradecylamino)-2-imidazoline.

4. 1-(β-hydroxyethyl)-2-(n-octadecylamino)-2-imidazoline.

References Cited in the file of this patent
UNITED STATES PATENTS

| | | |
|---|---|---|
| 2,586,844 | McKay et al. | Feb. 26, 1952 |
| 2,715,633 | Cain | Aug. 16, 1955 |